United States Patent [19]

Obbink

[11] Patent Number: 5,169,219
[45] Date of Patent: Dec. 8, 1992

[54] SYSTEM FOR INSTALLING CABINETRY

[76] Inventor: Richard A. Obbink, 108 E. 33rd, Holland, Mich. 49423

[21] Appl. No.: 731,429

[22] Filed: Jul. 17, 1991

[51] Int. Cl.⁵ ............................................. A47B 88/00
[52] U.S. Cl. .................................. 312/245; 248/354.3
[58] Field of Search ...................... 248/354.3; 312/245, 312/247, 312

[56] References Cited

U.S. PATENT DOCUMENTS

| | | | |
|---|---|---|---|
| 2,240,724 | 5/1941 | Stoehr | 248/354.3 |
| 2,854,307 | 9/1958 | Londeree et al. | 312/247 |
| 2,979,304 | 4/1961 | Teel | 248/354.3 |
| 3,729,245 | 4/1973 | Skifstrom | 312/247 X |
| 4,616,887 | 10/1986 | Oudman | 312/312 X |
| 4,717,212 | 1/1988 | Roberts | 312/312 X |

Primary Examiner—Joseph Falk
Attorney, Agent, or Firm—Price, Heneveld, Cooper, DeWitt & Litton

[57] ABSTRACT

A support to facilitate the installation of wall hung cabinets and the like includes a support member for supporting cabinets in a raised position such that the cabinets are positioned approximately where they are to be installed, and at least one rail support bracket connected to the support member and adapted to hold a rail with a plurality of individual cabinets thereon so that the cabinets can be aligned, interconnected, and attached to a support surface. The method includes providing a support member for cabinets, positioning the cabinets on the support member in a near final position, interconnecting the cabinets, and anchoring the cabinets to a support surface.

34 Claims, 4 Drawing Sheets

SYSTEM FOR INSTALLING CABINETRY

BACKGROUND OF THE INVENTION

This invention relates to an apparatus and method for installing wall, ceiling, or bulkhead mounted cabinets. The apparatus and method can be used on any type of cabinet, but is especially useful for the installation of frameless cabinets.

Installation of cabinets on walls, ceilings, bulkheads and the like is a significant expense when constructing or remodeling a kitchen or other room. One of the major reasons is because it is difficult to properly align, hold, and attach the cabinets in the raised overhead position. Another reason is that the supporting surfaces are uneven and corners are not square, thus aggravating and compounding alignment problems. These problems are present in new constructions, as well as older homes and buildings.

Cabinets such as kitchen cabinets are most commonly divided into two types - framed and frameless. Frameless cabinets are generally less expensive to manufacture than framed cabinets since frameless cabinets require fewer parts and less raw material, and since they normally require less factory assembly time. However, frameless cabinets are more difficult to align during installation due to the way in which they abuttingly interconnect, and therefore usually require additional installation time. This, of course, reduces their cost effectiveness over framed cabinets as well as increasing the overall costs to the purchaser.

Thus, an apparatus and/or method of installation is required to solve the aforementioned problems.

SUMMARY OF THE INVENTION

The present invention is a support to facilitate the installation of wall hung cabinets and includes a base, at least one vertically adjustable support member extending upwardly from the base, and at least one rail support bracket connected to the support member and adapted to hold a rail for resting cabinets thereon so that the cabinets can be positioned and interconnected in a near final position as well as attached to a support surface.

One aspect of the present invention is a method of installing cabinets including the steps of providing a support member, positioning cabinets thereon approximately where the cabinets will be located, interconnecting the cabinets, and anchoring the cabinets to a support surface.

Numerous advantages of the present invention will become apparent to one skilled in the art. The present invention facilitates installation of cabinets by permitting the cabinets to be positioned and aligned in a near installed position. This permits cabinets to be adjusted relative to each other, and also to be adjusted relative to the support wall ceiling or bulkhead that the cabinets are to be attached to. This cuts installation time by about fifty percent, and also allows an improved and better aligned installation. Particularly with frameless cabinets, the cabinets can be interconnected as a unit in a near final position before installation. Thus, alignment of cabinets is less affected by walls that are uneven and corners that are not square, and further, necessary adjustments can be made in a timely manner before installation. Also, the support allows a single operator to install cabinets with less assistance from helpers. Further, the cabinet supports of the present invention are readily portable, further facilitating installation of cabinets by a single person.

Thus, the present invention provides a compact and readily useable apparatus to facilitate the installation of wall hung cabinets and the like. These and other features, objects and advantages of the present invention will become apparent upon reading the following description thereof together with reference to the accompanying drawings in which:

DETAILED DESCRIPTION OF THE PREFERRED EMBODIMENT

Figure 1:
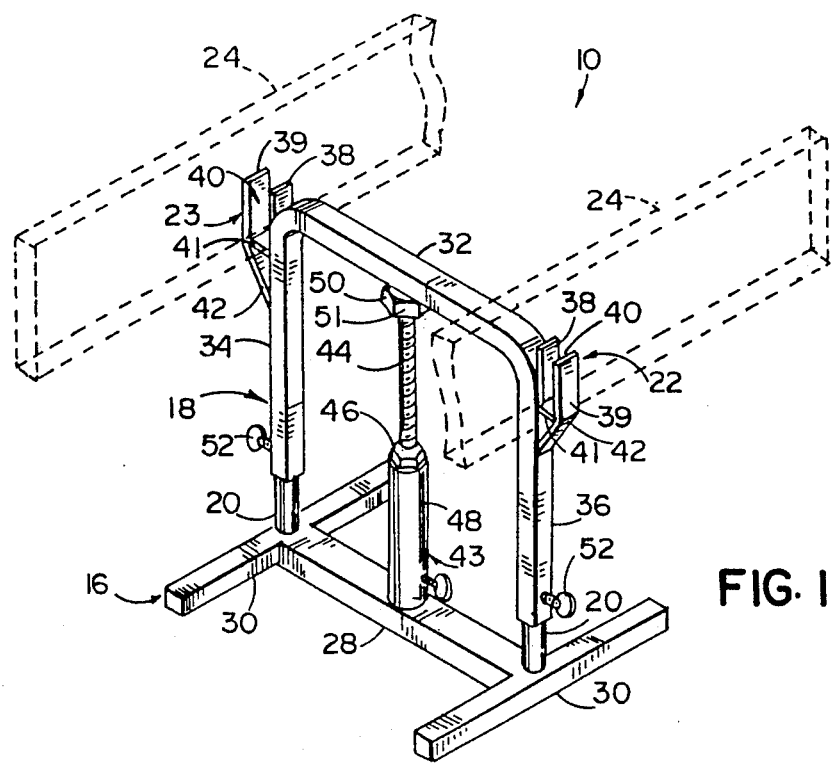
FIG. 1 is a perspective view of a support embodying the invention.
Figure 2:
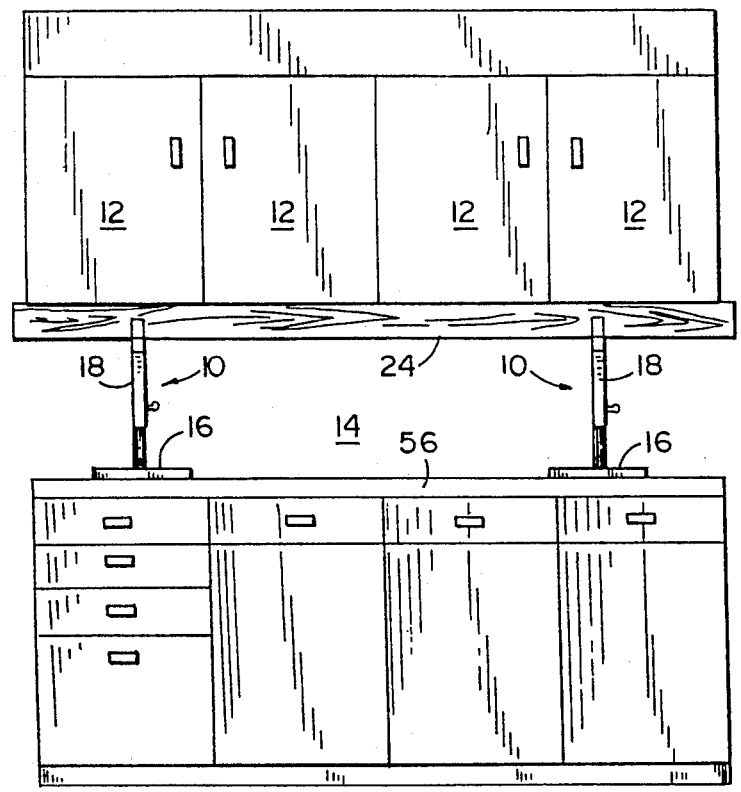
FIG. 2 is a front elevational view of a plurality of cabinets mounted on a pair of supports.
Figure 3:
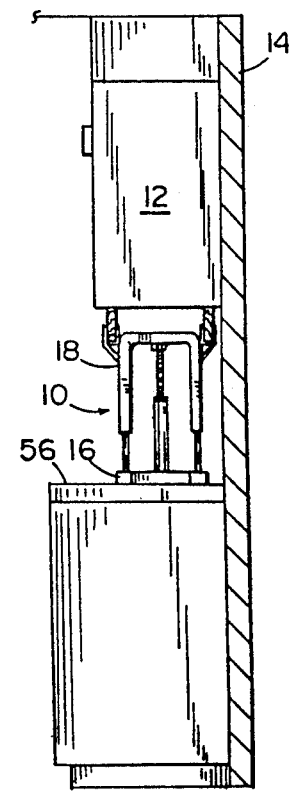
FIG. 3 is a side elevational view of FIG. 2.

Referring initially to FIGS. 1 and 2 there is shown a support or stand 10 embodying the present invention which is particularly adapted to facilitate the installation of wall hung cabinets 12 and the like on support surface 14 such as walls, ceilings, bulkheads and the like. Support 10 includes a base 16 and a vertically adjustable support member 18. Support member 18 is slideably vertically adjustable on guide posts or upright guides 20 of base 16, and includes spaced rail support brackets 22 and 23 that are adapted to hold rails 24 in spaced relation so that a plurality of cabinets 12 can be placed thereon in a near final position, aligned, positioned, interconnected, and then connected to support surface 14.

Base 16 (FIG. 1) includes a lower portion in the shape of an "H", the lower portion including a cross piece 28 and laterally extending legs 30. Legs 30 provide lateral support to support 10 to prevent support 10 from tipping over during use such as when set on a counter-top 56. Guide posts 20 rigidly connect to either end of cross piece 28 and extend upwardly therefrom. In the preferred embodiment, guide posts 20 are cylindrically-shaped rods, however, it is contemplated that they could be any of several different shapes and designs.

Support member 18 (FIG. 1) includes an inverted U-shaped tubular member having a horizontally oriented centerpiece 32 and downwardly extending side pieces 34 and 36. It is contemplated that support member 18 will be made from a one-piece bent tube having a square cross-section with an inner diameter sized to mateably slideably engage guide posts 20, although any number of different shapes and constructions are possible. On the outer and upper edge of side pieces 34 and 36 are two opposing rail support brackets 22 and 23. Rail support brackets 22 and 23 each include an inner and outer web 38 and 39, and also bottom web 41 that define a U-shaped pocket 40 for receiving rails 24. In the embodiment shown, rail support brackets 22 and 23 are supported in their upwardly open orientation by an angular web 42 that extends diagonally downwardly from the juncture of outer web 39 and bottom web 41, and connects to side pieces 34 (and 36). U-shaped pockets 40 can be any of several different shapes and sizes. In the preferred embodiment, U-shaped pocket 40 is contemplated to be about ¾ of an inch wide such that it can accept 1×6 boards or any ¾" material such as plywood as they are commonly found at construction sites.

A lift or jacking device 43 (FIG. 1) is located centrally on cross piece 28 and extends upwardly above cross piece 28 of base 16 and below horizontal centerpiece 32 of support member 18. The lift 43 includes a threaded shaft 44 which is threadably received through a nut 46 welded to the top of a cylindrical tube 48. Cylindrical tube 48 is securely rigidly welded to cross piece 28 and extends upwardly therefrom. Threaded shaft 44 includes a head 50 that abuts the underside of horizontal centerpiece 32. Head 50 includes flat side surfaces 51 such that it can be turned with a wrench or the like to rotate threaded shaft 44 and force support member 18 vertically upwardly (or downwardly) into the position desired. Set screws 52 are threaded into side pieces 34, 36 and can be rotated to lockingly engage guide posts 20, thereby lockingly holding support member 18 (and cabinets 12 located thereon) in a given vertical position. Set screws 52 include flattened heads that allow an operator to turn them with finger/thumb pressure or with a wrench or pliers.

Supports 10 are constructed to stably set on a counter-top 56, and are uniquely designed to be used in pairs (FIG. 2) so as to locate cabinets 12 in a near final position during installation. Use of a pair of supports 10 with bridging rails 24 allows multiple cabinets 12 to be loosely set thereon. Thus, the cabinets can be adjusted to align with each other and interconnected as desired. Further, support member 18 can be vertically adjusted through use of lift 43 so as to jack up one end or the other to fit the plurality of cabinets 12 as desired against a ceiling or bulkhead. This is particularly useful where the ceiling or bulkhead is not even, not uniform and/or not level, and adjustment is necessary in order to obtain a fully satisfactory installation.

Figure 4:
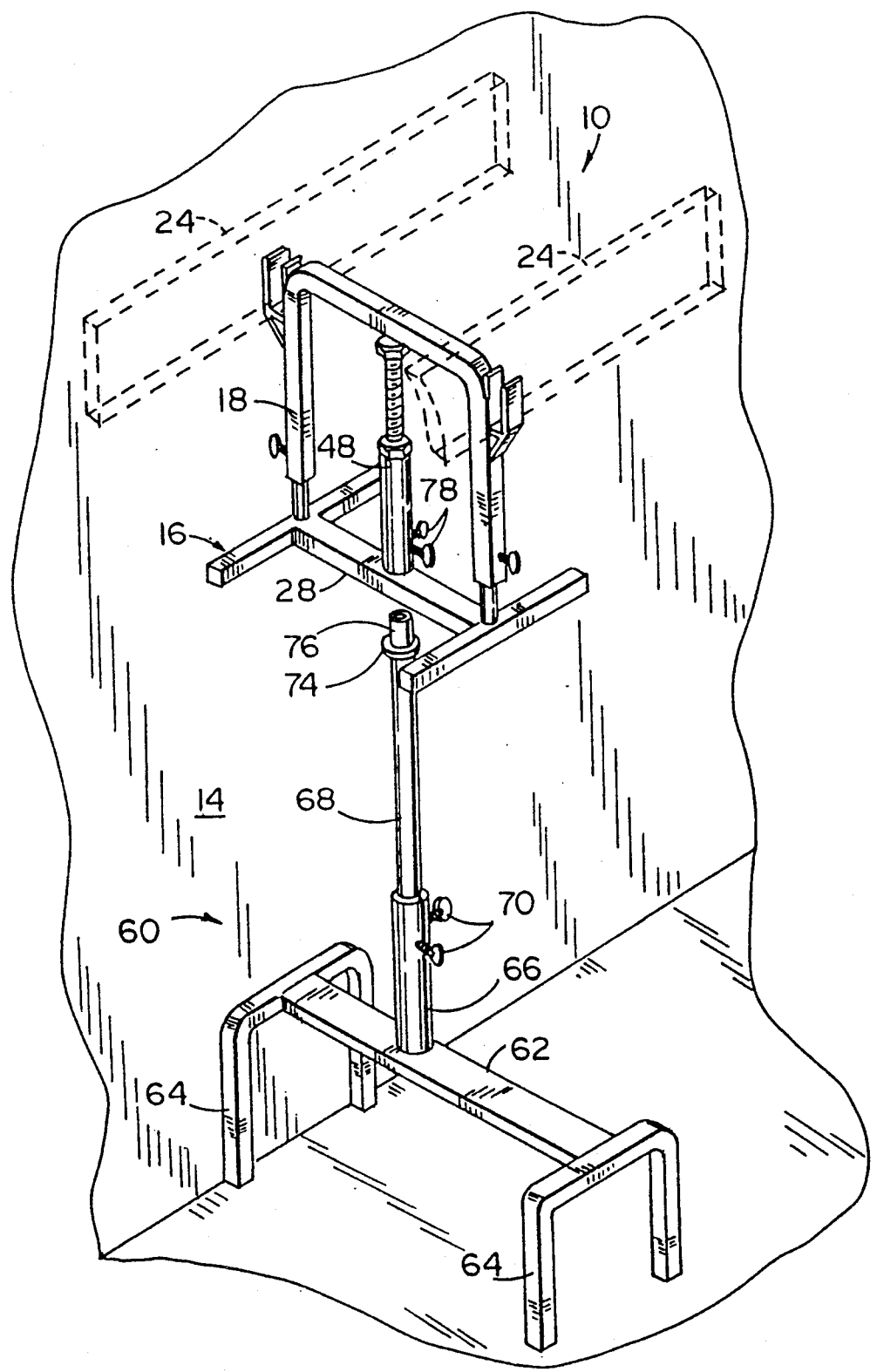
FIG. 4 is a perspective view of second embodiment including a floor stand.
Figure 6:
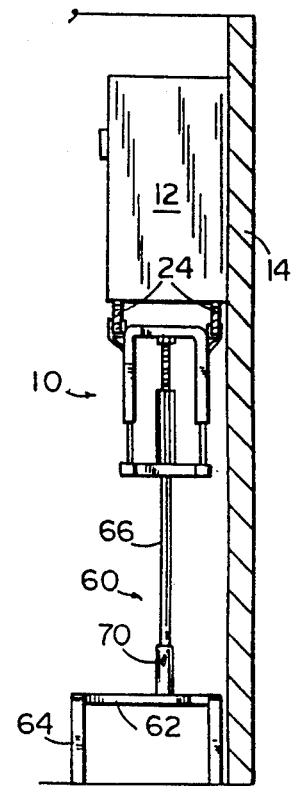
FIG. 6 is a side elevational view of FIG. 5.

In a second embodiment (FIG. 4), cross piece 28 of base 16 is provided with a hole or aperture (not shown) below cylindrical tube 48 such that support 10 can be installed onto and cooperate with a floor stand 60 to hold cabinets 12 in their near final installation position. Floor stand 60 is useful such as when counter-top 56 has not yet been installed. Floor stand 60 includes a base with lower cross piece 62 and four downwardly extending legs 64. A vertically extending cylindrical tube 66 is welded in an offset location to lower cross piece 62 (FIGS. 4 and 6) and vertically extends upwardly therefrom. A tube extender 68 mateably fits within the upwardly open end of vertically extending tube 66. Two set screws 70 are threaded into tube 66 such that set screws 70 can be rotated into tube 66 and into engagement with tube extender 68 to securely hold tube extender 68 therein. Set screws 70 include flattened heads that permit a user to install them with the use of his thumb or fingers or with a wrench. By use of such screws 70, tube extender 68 can be vertically adjusted to an optimum height. At the top end of tube extender 68 is a support ridge or ring 74 and upwardly extending protrusion 76. Protrusion 76 fits mateably through the hole in cross piece 28 and upwardly into cylindrical tube 48 such that support 10 is mateably and securely held by floor stand 60. Support ridge 74 provides vertical support by contacting the bottom of cross piece 28 on base 16. Two set screws 78 located near the bottom of cylindrical tube 48 are threadably received therethrough to engage protrusion 76 and securely hold support 10 onto floor stand 60.

Figure 5:
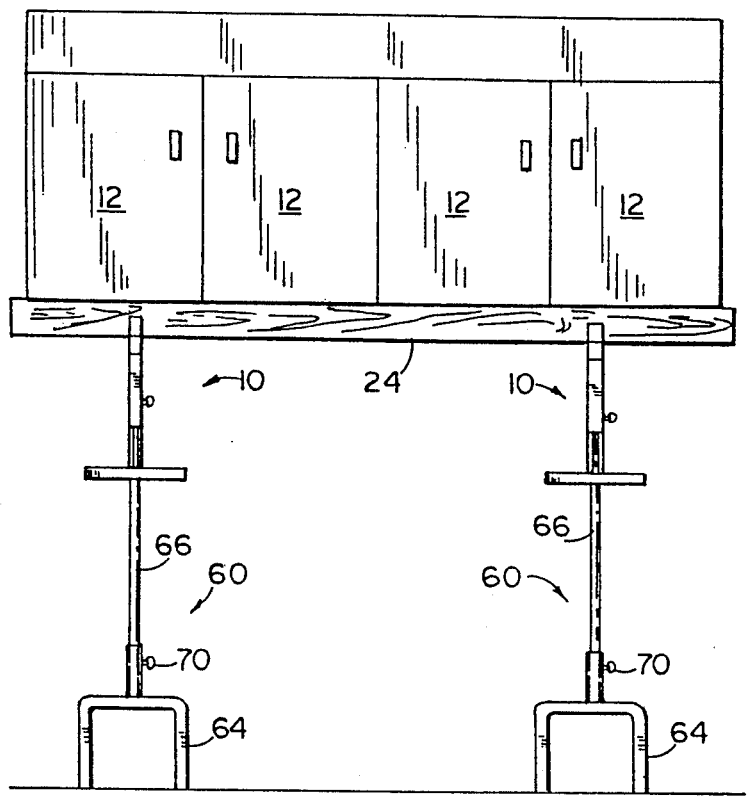
FIG. 5 is a front elevational view of a plurality of cabinets on a pair of supports and floor stands.

Floor stand 60 (FIG. 5) cooperates with supports 10 to provide a system for vertically supporting cabinets 12 even when counters and counter-tops 56 are not yet installed. Vertically extending tube 66 is offset on floor stand 60 with respect to legs 64 (FIG. 6) such that cabinets 12 do not tend to tip forward and fall over onto the operator. Restated, cabinets 12 are positioned on floor stand 60 so that their center of gravity is located rearwardly (due to the offset location of tube 66), thereby reducing the tendency of the cabinets to fall forward and damage the cabinets. Set screws 70 permit vertical adjustment to an optimum height before the placing of cabinets 12 on rails 24 which are held by supports 10. Support 10 can otherwise be used as discussed before, such as by adjusting threaded shaft 44 to vertically adjust the position of cabinets 12 to an optimum position for installation.

Figure 7:
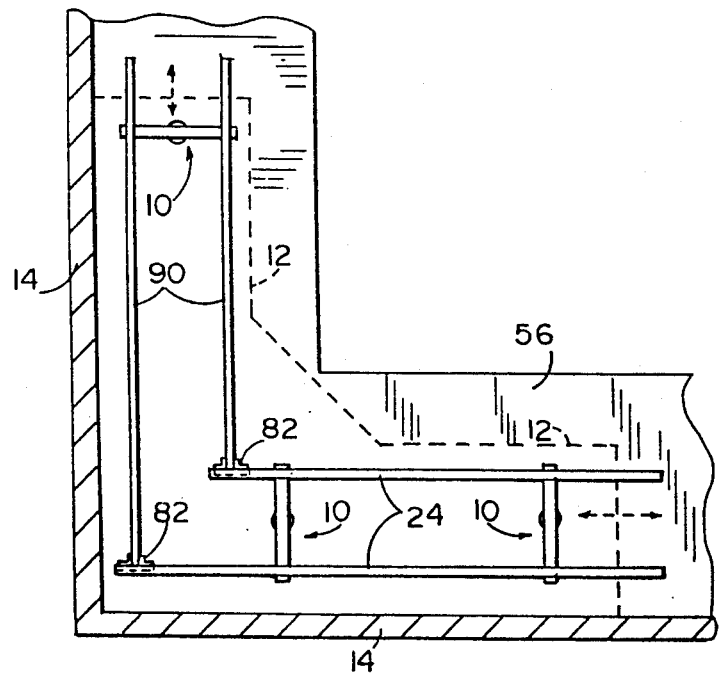
FIG. 7 is a plan view of third embodiment for installing cabinets around a corner.
Figure 8:
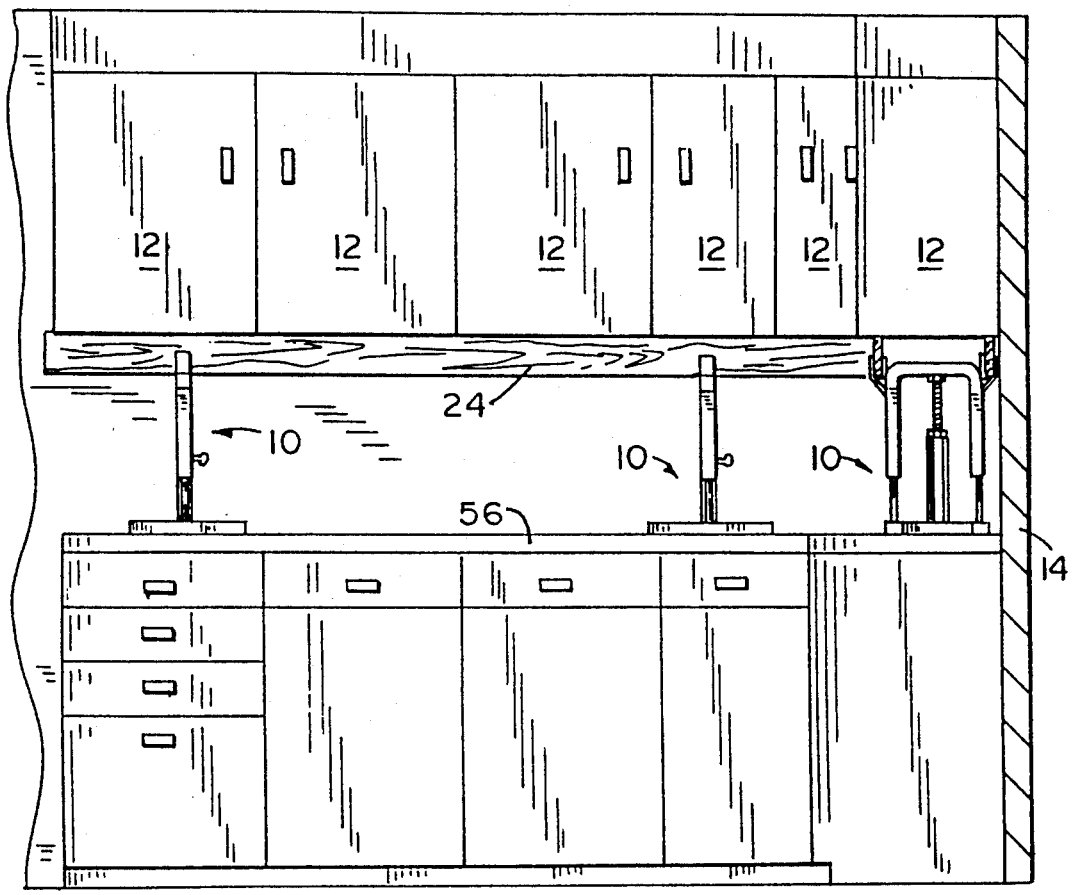
FIG. 8 is an elevational view of FIG. 7.
Figure 9:
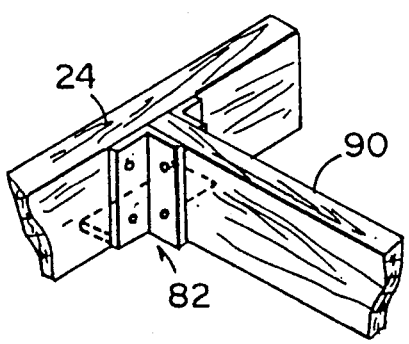
FIG. 9 is a perspective view of a corner rail support bracket as installed.
Figure 10:
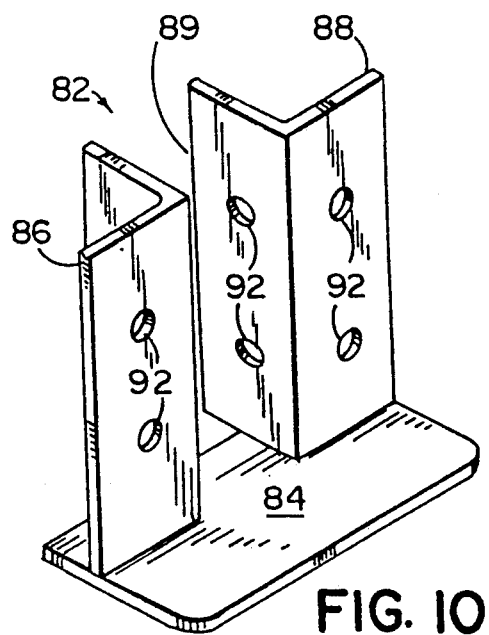
FIG. 10 is a perspective view of the corner bracket in FIG. 9.

In a third embodiment, a system for supporting cabinets in their installed position includes a corner rail support bracket 82 (FIGS. 7-10). Corner bracket 82 (FIGS. 9 and 10) is designed to mateably attach to a side of rail 24. Corner bracket 82 includes a lower flange 84 that abuts the underside of rail 24. Upstanding from an edge of lower flange 84 are two L-shaped members 86 and 88. Members 86 and 88 are short enough such that they do not interfere with cabinets 12 which are set on rails 24. L-shaped members 86 and 88 define a space 89 therebetween which receives an end of normally oriented rail 90. Both legs of L-shaped members 86 and 88 include attachment holes 92 so that corner bracket 82 can be securely attached to rails 24 and 90 to rigidly interconnect same. As shown in FIG. 7, with rails 24 and 90 properly secured to each other by corner brackets 82, three supports 10 can be used to support a plurality of cabinets 12 around a corner defined by support surface 14. This allows adjustment of the cabinets to compensate for unevenness in support surface 14 and lack of squareness on the corner of the support surface.

Thus it can be seen that the support of the present invention provides a unique support to facilitate the installation of wall hung cabinets and the like. The support permits multiple cabinets to be properly positioned relative to each other in a near final position and interconnected and attached to a support surface as desired in a time efficient and flexible manner. Further, the support allows the position of the cabinets to be adjusted such that an optimum alignment can be achieved before securing of the cabinets to a support surface. Further, the support is adaptable to cooperate with a floor stand such that the support can be used with or without counters in place. Also, the support is adaptable for use with a corner bracket such that the support can be used to align, interconnect and secure cabinets around a corner defined in the support surface.

It will become apparent to those skilled in the art that various modifications to the preferred embodiment of the invention can be made without departing from the spirit or scope thereof as defined by the appended claims and interpreted by the Doctrine of Equivalents.

The embodiments of the invention in which an exclusive property or privilege is claimed is defined as follows:

1. A portable support to facilitate installation of wall and bulkhead hung cabinets and the like comprising:
   a base;
   cabinet support means extending upwardly from said base for supporting the cabinets in a raised position, said cabinet support means including a vertically adjustable support member operably connected to said base and extending upwardly therefrom, said cabinet support means further including two spaced support brackets rigidly connected to said support member, said support brackets each being adapted to hold at least one rail for stably resting a plurality of cabinets thereon so that the cabinets can be properly positioned adjacent to each other, aligned in a near final position, interconnected, and attached to a support surface; and
   guide means for guiding the vertical movement of said support member on said base.

2. An apparatus as set forth in claim 1 including lift means to provide mechanical assistance for lifting and vertically adjusting said support member.

3. An apparatus as set forth in claim 2 wherein said guide means includes at least one vertically oriented guide post and said support member is telescopingly adjustable thereon.

4. An apparatus as set forth in claim 3 wherein said lift means includes a threaded shaft that can be rotated to vertically adjust said support member and lift the cabinets located thereon to an adjusted position.

5. An apparatus as set forth in claim 4 including locking means for locking said adjustable support member in said adjusted position.

6. An apparatus as set forth in claim 1 wherein said guide means includes at least one vertically oriented guide post and said support member is telescopingly adjustable thereon.

7. An apparatus as set forth in claim 1 including a threaded shaft that can be rotated to vertically adjust said support member so as to lift and position cabinets located thereon.

8. An apparatus as set forth in claim 1 including locking means for locking said adjustable support member in a given position.

9. A system of support including at least a pair of the supports as set forth in claim 1.

10. A system as set forth in claim 9 including a third support and also including at least one corner rail support bracket adapted to hold rails oriented at an angle to each other, said system being useful for installing cabinets which extend around a corner of a support surface.

11. A system as set forth in claim 9 wherein said base is adapted to stably set on a counter-top and position cabinets thereover.

12. A system as set forth in claim 9 including a floor stand adapted to mate with and hold said base at a level as if said base was positioned on a counter top.

13. A system as set forth in claim 12 wherein said floor stand is vertically adjustable so as to vary the level at which said base is positioned.

14. A support to facilitate for installation of wall and bulkhead hung cabinets and the like comprising:
   a base;
   cabinet support means extending upwardly from said base for supporting the cabinets in a raised position, said cabinet support means including a vertically adjustable support member operably connected to said base and extending upwardly therefrom, said cabinet support bracket support means further including at least one rail support bracket connected to said support member, said rail support bracket adapted to hold at least one rail for resting a plurality of cabinets thereon so that the cabinets can be properly positioned relative to each other in a near final position, interconnected, and attached to a support surface;
   guide means for guiding the vertical movement of said support member on said base; and
   a floor stand adapted to mate with and hold said base at a level as if said base was positioned on a counter top.

15. An apparatus as set forth in claim 14 wherein said floor stand includes leg means for stably supporting said floor stand in an upright position, and further includes upright vertical support means for engaging said base and supporting said base at said counter top level, said support means holding said base in an offset position relative to said leg means so that the cabinets have a center of gravity located rearwardly a sufficient distance to reduce the tendency of the cabinets to fall forwardly away from said support surface.

16. The apparatus as set forth in claim 15 wherein said vertical support means includes a vertically extending tube with a protrusion that engages said base and a support ridge that supports said base.

17. The apparatus as set forth in claim 16 wherein said vertically extending tube is vertically adjustable.

18. The apparatus as set forth in claim 16 wherein said base includes a lower portion with an aperture therein, said protrusion of said floor stand is adapted to protrude into said aperture, and said support ridge supports said lower portion at said counter-top level.

19. A portable system of support to facilitate the installation of wall and bulkhead hung cabinets and the like, comprising:
   a pair of bases each including a pair of spaced upright guides extending upwardly from said base;
   a pair of support members slideably mounted on said upright guides and vertically adjustable thereon, said support members including cabinet support means for stably holding a plurality of adjacent cabinets in a near final position so that the cabinets can be more easily aligned, interconnected, and attached in a final position to a support surface.

20. An apparatus as set forth in claim 19 wherein said support member includes an upper bracket defining two slots fixedly spaced from each other and adapted to stably hold rails suitable for resting cabinets thereon.

21. An apparatus as set forth in claim 20 including lift means to provide mechanical assistance for lifting and positioning said support member and cabinets placed thereon.

22. An apparatus as set forth in claim 21 including locking means for locking said support member in a given position.

23. An apparatus as set forth in claim 19 including lift means to provide mechanical assistance for lifting and positioning said support member and cabinets placed thereon.

24. An apparatus as set forth in claim 19 including locking means for locking said support member in a given position.

25. An apparatus as set forth in claim 19 including a corner bracket adapted to support rails oriented in two directions to facilitate the installation of cabinets on a support surface which extends around a corner.

26. An apparatus as set forth in claim 19 wherein said base is adapted to stably set on a counter-top and position the cabinets thereover in a near final installation position.

27. A support to facilitate the installation of wall and bulkhead hung cabinets and the like, comprising:
- a base including a pair of spaced upright guides extending upwardly from said base;
- a support member slideably mounted on said upright guides and vertically adjustable thereron, said support member including cabinet support means for holding cabinets in a near final position so that the cabinets can be more easily aligned, interconnected, and attached in a final position to a support surface, said support member further including guide means cooperating with said upright guides on said base for vertically guiding the adjustment of said support member; and
- a floor stand adapted to mate with said base and hold said base at a level as if said base was sitting on a counter top, said floor stand cooperating with said base to position the cabinets in a near final installation position.

28. An apparatus as set forth in claim 27 wherein said floor stand is vertically adjustable.

29. A method of installing wall and bulkhead hung cabinets and the like including the steps of:
- providing a support member for temporarily supporting a plurality of cabinets;
- positioning the plurality of cabinets on said support member so that the cabinets are properly positioned relative to each other and also stably positioned approximately where the cabinets are to be finally located on a support surface;
- interconnecting the cabinets; and then anchoring the cabinets to the support surface.

30. A method as set forth in claim 29 including the step of finely adjusting the position of the cabinets relative to the support surface after interconnecting the cabinets.

31. A method as set forth in claim 30 including locking said support member in position after finely adjusting the position of the cabinets.

32. A method as set forth in claim 31 including:
- providing a corner rail support bracket that cooperates with the support member to support a plurality of cabinets arranged around a corner defined by the support surface; and
- positioning the cabinets on said support member around the corner of the support surface.

33. A method as set forth in claim 29 including positioning said support member on a counter-top-like surface before the step of positioning a plurality of cabinets on said support member.

34. A method as set forth in claim 29 including the step of removing the support member after the steps of interconnecting and anchoring.

* * * * *